US009744936B2

(12) United States Patent
Kruse

(10) Patent No.: US 9,744,936 B2
(45) Date of Patent: Aug. 29, 2017

(54) CURTAIN AIRBAG FOR A VEHICLE AND A RESTRAINING ARRANGEMENT

(71) Applicant: Dion Kruse, Alingsås (SE)

(72) Inventor: Dion Kruse, Alingsås (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/032,729

(22) PCT Filed: Oct. 27, 2014

(86) PCT No.: PCT/SE2014/051260
§ 371 (c)(1),
(2) Date: Apr. 28, 2016

(87) PCT Pub. No.: WO2015/065272
PCT Pub. Date: May 7, 2015

(65) Prior Publication Data
US 2016/0280178 A1 Sep. 29, 2016

(30) Foreign Application Priority Data

Oct. 29, 2013 (DE) .......................... 10 2013 221 983

(51) Int. Cl.
*B60R 21/16* (2006.01)
*B60R 21/232* (2011.01)
(Continued)

(52) U.S. Cl.
CPC .......... *B60R 21/232* (2013.01); *B60R 21/233* (2013.01); *B60R 2021/0004* (2013.01);
(Continued)

(58) Field of Classification Search
CPC ... B60R 21/233; B60R 21/213; B60R 21/232; B60R 21/2338; B60R 21/23138;
(Continued)

(56) References Cited

U.S. PATENT DOCUMENTS 7,784,823 B2 * 8/2010 Heigl .................... B60R 21/213
280/730.2
8,505,961 B2 8/2013 Jakobsson
(Continued)

FOREIGN PATENT DOCUMENTS

| DE | 102011087449 A1 | 6/2013 |
| WO | WO-2012111073 A1 | 8/2012 |
| WO | WO-2014210475 A1 | 12/2014 |

OTHER PUBLICATIONS

International Search Report for PCT/SE2014/051260, ISA/SE, mailed Jan. 30, 2015.
(Continued)

*Primary Examiner* — Toan To
(74) *Attorney, Agent, or Firm* — Stephen T. Olson; Harness, Dickey & Pierce, P.L.C.

(57) ABSTRACT

A curtain airbag for a vehicle has a main chamber shaped in the position being mounted on the vehicle, in the inflated state covering an inner side structure of the vehicle. The curtain airbag has an additional chamber which, in the mounting position, is located at the in driving direction of the vehicle front portion of the main chamber, and deploys in the direction of the interior of the vehicle when the curtain airbag is inflated. The additional chamber is attached to the main chamber so as to be positioned in the inflated state between the front portion of the main chamber and an occupant to be restrained by the curtain airbag.

14 Claims, 3 Drawing Sheets

Figure 1:
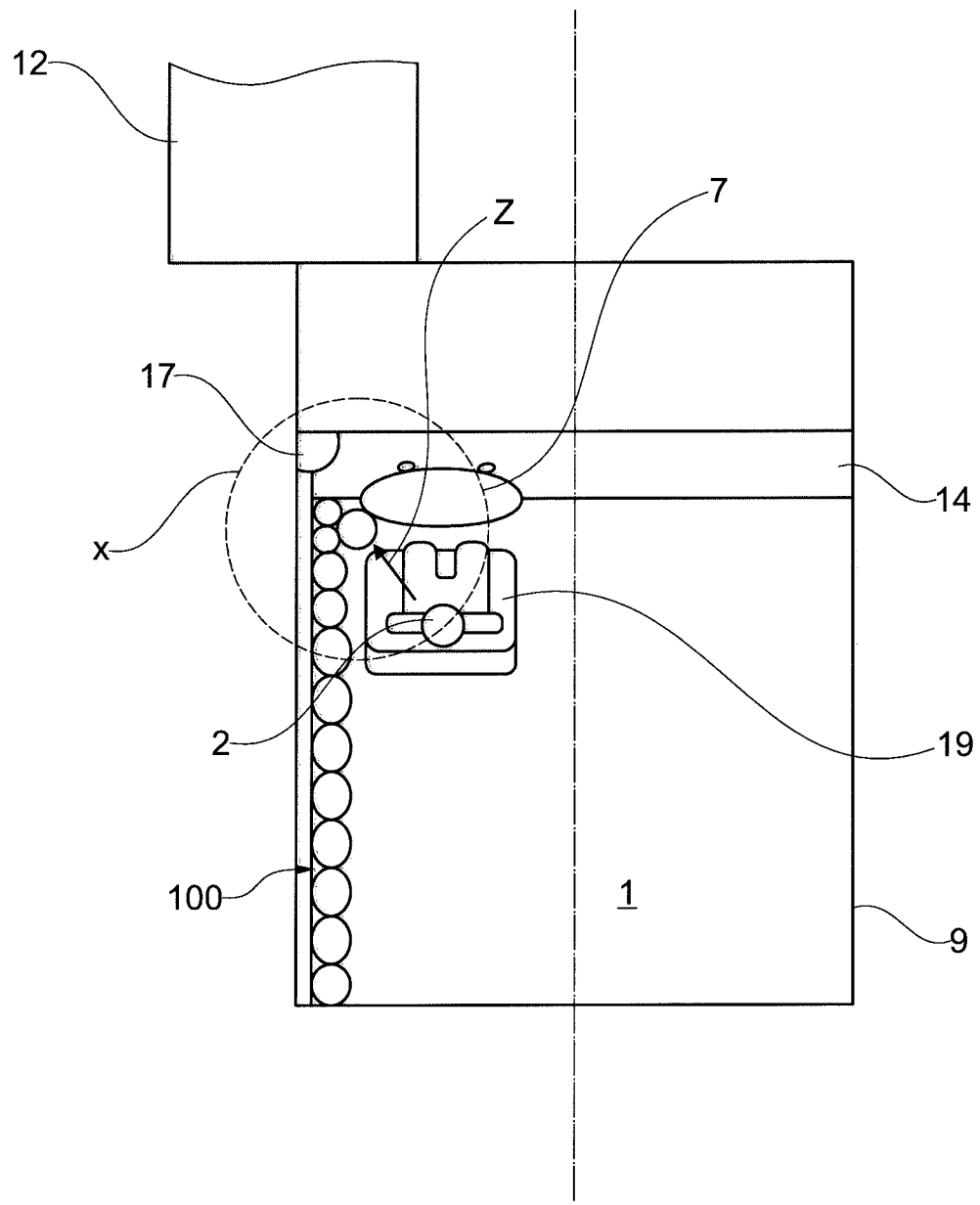

(51) Int. Cl.
*B60R 21/233* (2006.01)
*B60R 21/231* (2011.01)
*B60R 21/00* (2006.01)

(52) U.S. Cl.
CPC ............... *B60R 2021/0006* (2013.01); *B60R 2021/0032* (2013.01); *B60R 2021/23107* (2013.01)

(58) Field of Classification Search
CPC B60R 2021/23386; B60R 2021/23161; B60R 2021/23324
USPC ............................ 280/730.1, 730.2, 731, 732
See application file for complete search history.

(56) References Cited

U.S. PATENT DOCUMENTS

| | | | |
|---|---|---|---|
| 8,998,250 B2 | 4/2015 | Kruse et al. | |
| 9,266,492 B2 | 2/2016 | Byun | |
| 9,487,180 B2* | 11/2016 | Nakashima | B60R 21/233 |
| 2006/0097492 A1* | 5/2006 | Bakhsh | B60R 21/232 |
| | | | 280/730.2 |
| 2010/0032930 A1* | 2/2010 | Yamamura | B60R 21/232 |
| | | | 280/730.2 |
| 2013/0270805 A1* | 10/2013 | Kruse | B60R 21/232 |
| | | | 280/730.2 |
| 2014/0042732 A1* | 2/2014 | Taguchi | B60R 21/233 |
| | | | 280/729 |
| 2014/0239617 A1 | 8/2014 | Dix | |
| 2015/0115581 A1* | 4/2015 | Mazanek | B60R 21/232 |
| | | | 280/730.2 |
| 2015/0367810 A1 | 12/2015 | Gilles et al. | |

OTHER PUBLICATIONS

Written Opinion of the ISA for PCT/SE2014/051260, ISA/SE, mailed Jan. 30, 2015.

* cited by examiner

CURTAIN AIRBAG FOR A VEHICLE AND A RESTRAINING ARRANGEMENT

CROSS-REFERENCE TO RELATED APPLICATIONS

This application is a 371 U.S. National Stage of International Application No. PCT/SE2014/051260, filed Oct. 27, 2016, which claims the benefit of and priority to German Patent Application No. 102013221983.0, filed Oct. 29, 2013. The entire disclosures of the above applications are incorporated herein by reference.

The invention relates to a curtain airbag for a vehicle comprising the features of the preamble of claim 1 and a restraining arrangement.

The curtain airbag is located in the vehicle at the upper edge of the inner side structure of the vehicle and, in the event of an accident, is inflated in such a way that in the inflated state it covers the inner side structure of the vehicle and thereby prevents the occupant from directly hitting the same and sustaining severe injuries or being thrown out of an open window.

For the protection of the occupant, an airbag, which is designed as most often a round bag and in the inflated state covers the steering wheel, is further provided in the steering wheel of the vehicle as well. As the steering wheel naturally is arranged to perform a rotational movement, with a steering wheel hub not being fixed the airbag as well performs this rotational movement, so that the airbag itself needs to be designed to be symmetric and in particular to be round, in order that it can fulfill its protective function independent of the position of the steering wheel.

Thus, in the event of an accident, during the occurring forward movement the occupant generally is protected by the side curtain airbag and the airbag in the steering wheel.

In tests it has turned out that in the event of a frontal impact with a small overlap only, for example of 10-25% of the front end of the vehicle, or a corner or angled impact, the A-pillar already at low impelling forces is dislocated very far into the passenger compartment. Furthermore, the dashboard of the vehicle is dislocated from its side edge obliquely to the center and the lower part of the A-pillar is intruding into the compartment of the vehicle, so that an enlarged gap between the side edge of the dashboard and the inner side structure of the vehicle is generated. Also owing to the impact direction the occupant is accelerated directly in the direction of the gap existent between the curtain airbag and the airbag of the steering wheel, so that owing to the non-existent connection of the airbags the occupant may hit the A-pillar moving in or from above may hit the side door frame through the airbags, or the occupant slides of the frontal airbag into the gap.

For the above-mentioned reasons, an enhanced risk of injury for the occupant even results from accidents with low impelling forces and a small lateral overlap.

In the DE 10 2011 087 449 A1 it is suggested that the curtain airbag comprises an additional chamber which, in the mounting position, is located on the in driving direction of the vehicle front portion of the main chamber, and deploys in the direction of the interior of the vehicle when the curtain airbag is inflated, wherein an extended section is provided which connects the additional chamber and the main chamber at a rim section at the same side and which limits the movement of the additional chamber during the inflation process. Thus, the curtain airbag is inflated together with the additional chamber to form a curved structure, in which the occupant is caught during the forward displacement, so that he cannot pass through the gap between the curtain airbag and the airbag in the steering wheel. The additional chamber deploying into the interior of the vehicle owing to its direction of deployment covers the A-pillar and the front section of the upper door frame, so that the surface of the interior of the vehicle as a whole is covered by the curved curtain airbag even in an area, the occupant would be very likely to hit during the obliquely directed forward displacement, whereby the risk of severe injuries in the event of accidents with a small overlap can be reduced. The occupant is caught in this design in the cavity between the main chamber and the additional chamber, where he is protected in front direction and side direction as well from hitting onto the vehicle structure.

It is the object of the invention to provide a curtain airbag, with which the risk of injury for the occupant which is enhanced due to the above-mentioned reasons can be further reduced.

For the solution of the object it is proposed that at least one of the additional chamber, which deploys towards the interior of the vehicle when the curtain airbag is inflated, is attached to the main chamber in that way, that it is positioned in the inflated state between the front portion of the main chamber and an occupant to be restrained by the curtain airbag. The advantage of the suggested solution can be seen therein, that the additional chamber is supported by the front portion of the main chamber, when the occupant hits onto the additional chamber. Therefore the risk of a displacement of the additional chamber and possible injuries of the occupant may be reduced. The suggested design enables a structure of the inflated chambers with an improved positioning of the additional chamber, which results finally in an improved restraining characteristic. Furthermore the additional chamber provides an early support for the head of the occupant, because the additional chamber is located closer to the occupant. Therefore the risk of brain-, head- or neckrotation may be reduced.

Furthermore it is suggested that the additional chamber comprises in a horizontal cross-section in projection towards a gap between the curtain airbag and an adjacent frontal airbag a greater width than the width of the gap. The advantage of the greater width can be seen therein that the additional chamber may not dive through the gap even when the occupant hits with a higher force onto the additional chamber. The additional chamber gets a further support from the frontal driver or passenger airbag and the curtain airbag creates together with the adjacent frontal airbag a restraining structure without a gap between the single airbags.

According to another preferred embodiment it is suggested that the additional chamber is connected with the front portion of the main chamber by a first non-inflatable section and with a second portion of the main chamber which is arranged closer to the occupant by a second non-inflatable section. The inflation characteristic is controlled via the first and the second non-inflatable sections, wherein the first non-inflatable section acts as a hinge enabling the movement towards the interior and later backwards onto the main chamber while the second non-inflatable section pulls the additional chamber backwards.

To achieve the intended movement of the additional chamber it is further important, that the length of the second non-inflatable section and the length of the first non-inflatable section are dimensioned in relation to the distances between the attachment points of each section in such a way, that the second non-inflatable section is tensioned and the first non-inflatable section is not tensioned or tensioned after the second non-inflatable section is tensioned during the inflation process.

Furthermore it is suggested that the first non-inflatable section comprises a length which enables a position of the inflated additional chamber between the occupant and a gap between the main chamber and an adjacent inflated frontal airbag. The suggested length is important because the first non-inflatable section may not stop the movement of the additional chamber, so that the additional chamber reaches the intended position between the occupant and a front portion of the main chamber, and gets supported by the front portion when the occupant hits onto the additional chamber.

The second non-inflatable section is designed preferably as a strap connecting the additional chamber at an upper and/or lower rim with the main chamber. The second non-inflatable section got only the purpose to influence the movement of the additional chamber by building a connection between the additional chamber and a section of the main chamber which is closer to the occupant, so that the additional chamber is pulled towards the occupant. To achieve the movement it is sufficient to use just a strap with a very low weight and volume, so that the curtain airbag according to the invention does not need more space and the weight is only slightly higher.

It has been shown in various tests that the first non-inflatable section should comprise a length in a horizontal cross-section of 100 to 400 mm, while the second non-inflatable inflatable section should comprise a length in a horizontal cross-section of 100 to 300 mm.

The support of the additional chamber may be further improved, when the main chamber comprises at least one cavity in the inflated state in which the additional chamber abuts when inflated. The additional chamber may be supported therefore also in length direction of the main chamber by abutting in the cavity. The cavity provides also a support sidewise to the main chamber to prevent a sliding of the additional chamber on the main chamber.

In the following the invention shall be illustrated on the basis of preferred embodiments with reference to the accompanying drawings, wherein:

FIG. 1: shows a vehicle in a small overlap impact from the top, and

Figure 2:
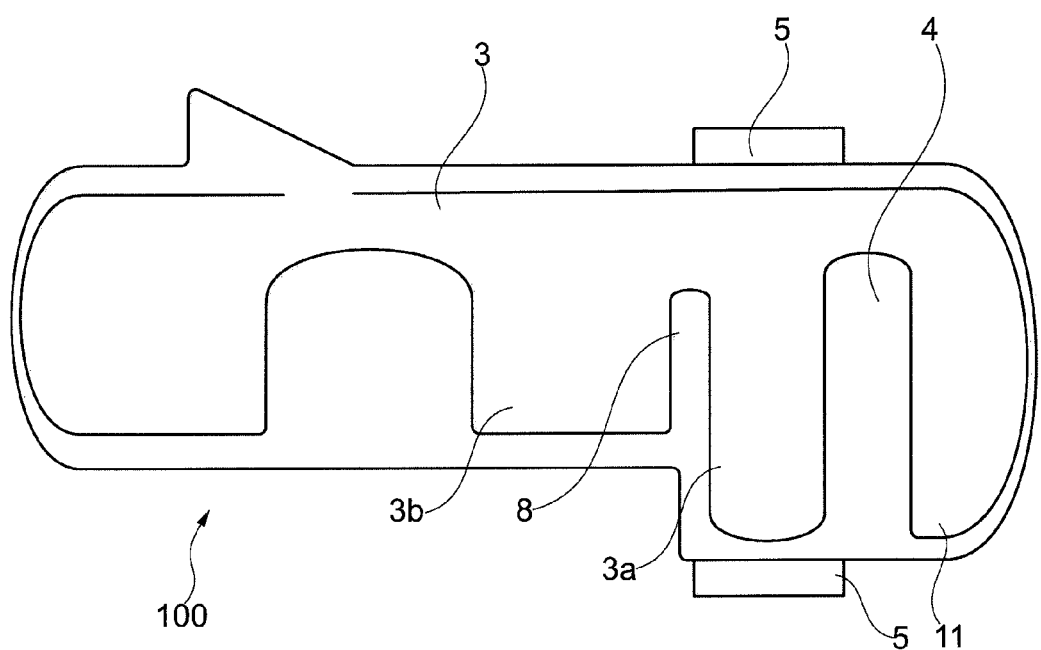

FIG. 2: shows a curtain airbag in an unfolded state, and

Figure 3:
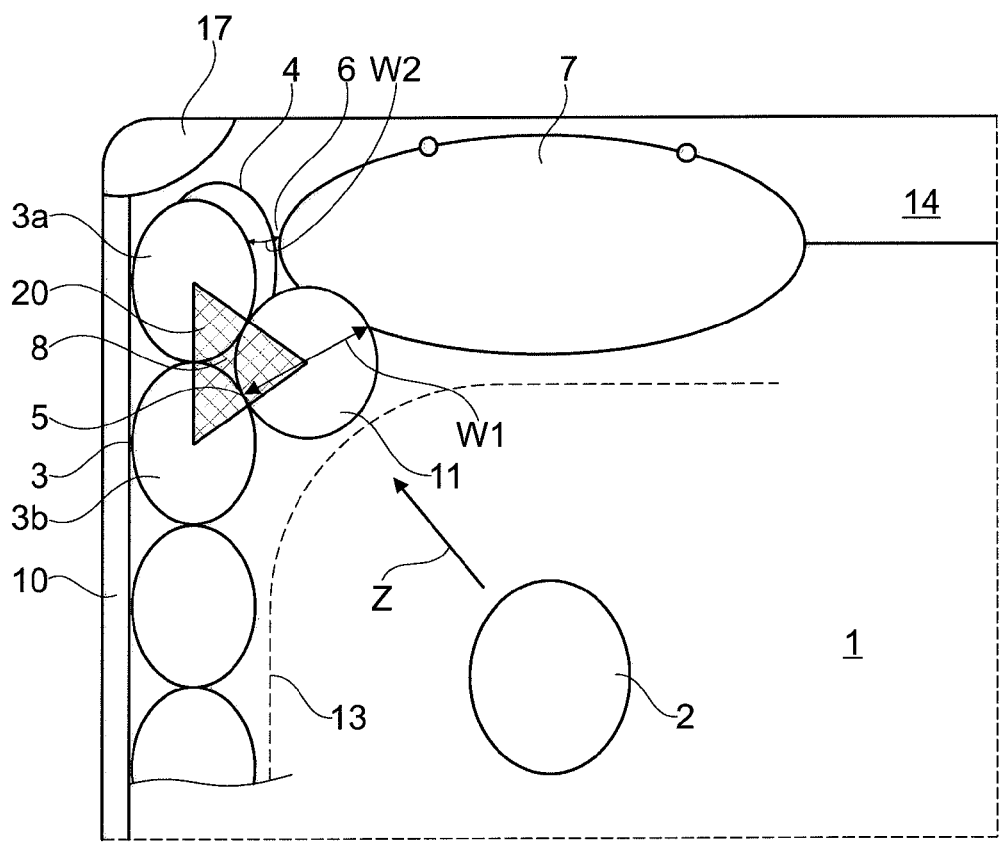

FIG. 3: shows the enlarged section X from FIG. 1.

FIG. 1 shows a vehicle 9 from the top, which impacts on an object 12 with a small overlap. The dashboard 14 and the A-pillar 17 may be deformed into the interior 1 of the vehicle 9, so that an enlarged gap may be created between the dashboard 14 and an inner side structure 10 of the vehicle.

Furthermore a curtain airbag 100 has been inflated and covers the inner side structure 10 of the vehicle 9. The vehicle 9 is being decelerated by the object 12 intruding frontally with a small overlap. Therefore the A-pillar 17 may be pushed into the interior 1 of the vehicle and the dashboard 14 may be displaced from its edge in the direction of the center of the interior 1 by the intruding object 12. Furthermore, an occupant 2 sitting in a vehicle seat 19 can be seen, which owing to the suddenly acting vehicle deceleration performs a forward movement in the direction Z towards the A-Pillar 17. In front of the occupant 2 it is located a steering wheel with a frontal airbag 7, which may be a driver or a passenger airbag.

In the FIG. 2 an enlarged view of the curtain airbag 100 before being folded is shown. In FIG. 3 an enlarged view of the detail X of FIG. 1 is shown. The curtain airbag 100 comprises a main chamber 3 covering the inner side structure 10 of the vehicle and an additional chamber 11 located at a front portion 3a of the main chamber 3 with respect to the driving direction of the vehicle 9. The additional chamber 11 is connected via a first non-inflatable section 4 at the front portion 3a of the main chamber 3. Furthermore the additional chamber 11 is attached via a second non-inflatable section 5 with a second middle portion 3b of the main chamber 3, which is closer to the occupant 2, so that the additional chamber 11 is pulled towards the interior 1 in a first step and later in a second step backwards towards a middle portion 3b of the main chamber 3. In the FIG. 2 the second non-inflatable section 5 is not connected with a front part at the additional chamber 11, which is necessary for the inflation characteristic but, for a better visibility, is not done here and the additional chamber 11 is not abutting at the main chamber 3. The additional chamber 11 is connected via the first non-inflatable section 4 and a flow channel 21 to the main chamber 3, and is sewn after the folding with a rim at the second non-inflatable section 5. The additional chamber 11 and the adjacent front portion 3a of the main chamber 3 extend downwards over the lower rim of the main chamber 3, so they are dimensioned in vertical direction longer than the rest of the main chamber 3. Therefore the additional chamber 11 and the front portion 3b of the main chamber 3 are supported also by lower parts of the inner structure of the vehicle like the dashboard 14, the door structure or the lower part of the side and/or front window.

As the additional chamber 11 of the curtain airbag 100 according to the invention is located on the main chamber 3 in such a way that it deploys in the direction of the interior 1 of the vehicle, the curtain airbag 100 covers with the additional chamber 11 the A-pillar 17 and/or the upper edge of the door frame, so that the occupant 2 cannot hit on one of these parts in a non-protected manner. In fact, a catching structure, which laterally as well as frontally protects the occupant 2 and in particular the head of the occupant 2, is provided by the additional chamber 11 and the main chamber 3 in this area. Provided that the occupant 2 is wearing a safety belt, the obliquely directed forward movement already results from the safety belt engaging asymmetrically over a shoulder of the occupant 2 and/or from the angled direction of the impact, which results in diagonal acceleration forces acting on the occupant 2.

According to the invention the additional chamber 11 is attached via the non-inflatable sections 4 and 5 in that way, that the inflated additional chamber 11 is located between the front portion 3a of the main chamber 3 and the occupant 2 after the inflation, so that the additional chamber 11 is supported by the front portion 3a of the main chamber 3 when the occupant 2 hits onto the additional chamber 11 because of the forward displacement in direction Z. The second non-inflatable section 5 may be designed as a strap or as well as a triangular extended section 20, also called "sail", which limits the movement of the additional chamber 11 to the interior 1 of the vehicle. As the additional chamber 11 is supported by the front portion 3a of the main chamber 3 in the inflated state, the additional chamber 11 is not pushed through a gap 6 between the front portion 3a and the adjacent frontal airbag 7, when the occupant 2 hits onto the additional chamber 11. The additional chamber 11 is dimensioned with a width W1 in projection to the gap 6 in the inflated state which is greater than the width W2 of the gap 6. Therefore the additional chamber 11 is covering the gap 6 completely and it is further prevented that the additional chamber 11 may enter into the gap 6. Furthermore the main chamber 3 comprises a cavity 8 at the side facing the additional chamber 11 between the front portion 3a and the adjacent middle portion 3b, in which the additional chamber 11 enters at least sectionally, so that the additional chamber 11 is further supported sidewise in the shown position abutting at the main chamber 3.

One important feature of the design is that the first non-inflatable section 4 is dimensioned in a length which enables a movement of the additional chamber 11 into the interior 1 of the vehicle 9 and afterwards a movement backwards onto the main chamber 3. The backward directed movement of the additional chamber 11 is realized by the shorter second non-inflatable section 5 which is tensioned during the inflation process and pulls the additional chamber 11 towards the occupant 2. The first non-inflatable section 4 must be designed in a length, which is long enough that it does not block the backwards directed movement of the additional chamber 11 onto the main chamber 3.

The curtain airbag 100 and the frontal airbag 7 are inflated in a sequence or with a time delay and are designed with a geometry, by which a conflict or a collision the curtain airbag 100 and the frontal airbag 7 may be avoided.

The first non-inflatable section 4 may be manufactured a single layer of the fabric, which connects the additional chamber 11 and the front portion 3a of the main chamber 3. The main chamber 3 and the additional chamber 11 may be further connected via a not shown inflatable section, which enables the inflation of the main chamber 3 and the additional chamber 11 with only one gas generator.

Furthermore the invention is advantageous, as the first non-inflatable section 4 is designed as a longer and as a bigger surface section, so that the necessary gas volume to inflate the curtain airbag 100 can be reduced and a smaller gas generator can be used. Furthermore, the first non-inflatable section 4 can be produced as a single layer, so that the package of the curtain airbag 100 is smaller especially in the front section, which needs to be arranged inside the very narrow A-pillar 17.

The curtain airbag 100 can be manufactured by sewing up two fabric layers or by a fabric layer which is woven as one piece according to the "One Piece Woven (OPW)"-Technology, wherein the additional chamber 11 can be part of the fabric layer/s. When the curtain airbag 100 is manufactured according to the OPW-Technology, also the additional chamber 11 can be manufactured simultaneously during the weaving process.

It has been shown, that the risk of injuries caused by a neck-, head- or brainrotation can be reduced when the occupant 2 is caught in an early support, so that the maximum relative velocity of the occupant 2 to the vehicle 9 can be reduced and the distance over which the occupant 2 is decelerated is increased afterwards. The ideal early support distance is shown in FIG. 3 by the dotted line 13. It is clearly visible that the restraining arrangement provided by the frontal airbag 7 and the curtain airbag 100 may designed by the inventive solution with a surface which is much closer to the ideal line for the early support shown by the dotted line 13. The additional chamber 11 fills the very deep recess between the frontal airbag 7 and the curtain airbag 100, so that the occupant 2 is caught in case of a movement in Z-direction in a much earlier phase compare to earlier known solutions. This early support is positive regarding a possible rotation of the head, neck or brain, and the injuries caused thereby.

The invention claimed is:

1. A curtain airbag for a vehicle comprising:
   a main chamber shaped to cover an inner side structure of the vehicle when mounted in the vehicle and inflated;
   at least one additional chamber located at a front portion of the main chamber in a driving direction of the vehicle and deployable toward an interior of the vehicle when the curtain airbag is inflated, the at least one additional chamber attached to the main chamber so as to be positioned in an inflated state between the front portion of the main chamber and an occupant to be restrained by the curtain airbag,
   wherein the at least one additional chamber includes in a horizontal cross-section in projection towards a gap between the curtain airbag and an adjacent frontal airbag a greater width than a width of the gap.

2. The curtain airbag according to claim 1, wherein the additional chamber is connected with the front portion of the main chamber by a first non-inflatable section and with a second portion of the main chamber which is arranged closer to the occupant by a second non-inflatable section.

3. The curtain airbag according to claim 2, wherein a length of the second non-inflatable section and a length of the first non-inflatable section are dimensioned in relation to a distance between attachment points of each section such that the second non-inflatable section is tensioned and the first non-inflatable section is not tensioned or tensioned after the second non-inflatable section is tensioned during the inflation process.

4. The curtain airbag according to claim 2, wherein the first non-inflatable section includes a length which enables a position of the inflated additional chamber between the occupant and a gap between the main chamber and an adjacent inflated frontal airbag.

5. The curtain airbag according to claim 2, wherein the second non-inflatable section is designed as a strap connecting the additional chamber at an upper and/or lower rim with the main chamber.

6. The curtain airbag according to claim 2, wherein the first non-inflatable section has a length in a horizontal cross-section of 100 to 400 mm.

7. The curtain airbag according to claim 2, wherein the second non-inflatable section has a length in a horizontal cross section of 100 to 300 mm.

8. The curtain airbag according to claim 1, wherein the main chamber has at least one cavity in the inflated state in which the additional chamber abuts when inflated.

9. A restraining arrangement with the curtain airbag according to claim 1 and a frontal airbag.

10. A curtain airbag for a vehicle comprising:
    a main chamber shaped to cover an inner side structure of the vehicle when mounted in the vehicle and inflated;
    at least one additional chamber located at a front portion of the main chamber in a driving direction of the vehicle and deployable toward an interior of the vehicle when the curtain airbag is inflated, the at least one additional chamber attached to the main chamber so as to be positioned in an inflated state between the front portion of the main chamber and an occupant to be restrained by the curtain airbag,
    wherein the at least one additional chamber includes in a horizontal cross-section in projection towards a gap between the curtain airbag and an adjacent frontal airbag a greater width than a width of the gap,
    wherein the additional chamber is connected with the front portion of the main chamber by a first non-inflatable section and with a second portion of the main chamber which is arranged closer to the occupant by a second non-inflatable section.

11. A curtain airbag for a vehicle comprising:
a main chamber shaped to cover an inner side structure of the vehicle when mounted in the vehicle and inflated;
at least one additional chamber located at a front portion of the main chamber in a driving direction of the vehicle and deployable toward an interior of the vehicle when the curtain airbag is inflated, the at least one additional chamber attached to the main chamber so as to be positioned in an inflated state between the front portion of the main chamber and an occupant to be restrained by the curtain airbag, the front portion of the main chamber extending farther forward in the driving direction as compared to the at least one additional chamber.

12. The curtain airbag of claim 11, in combination with a restraining arrangement including a frontal airbag, the frontal airbag extending laterally across the vehicle, the main chamber extending perpendicular to the frontal airbag, the additional chamber located at a corner defined by an intersection between the main chamber and the frontal airbag.

13. The curtain airbag of claim 11, wherein the at least one additional section is attached to the main chamber via at least one non-inflatable section.

14. The curtain airbag of claim 11, wherein the at least one additional section is attached to the main chamber via first and second non-inflatable sections.

* * * * *